(12) United States Patent
Masugi et al.

(10) Patent No.: US 9,277,133 B2
(45) Date of Patent: Mar. 1, 2016

(54) IMAGING APPARATUS SUPPORTING DIFFERENT PROCESSING FOR DIFFERENT OCULAR STATES

(71) Applicant: Olympus Imaging Corp., Shibuya-ku, Tokyo (JP)

(72) Inventors: Tatsuro Masugi, Akiruno (JP); Jun Sugawara, Hachioji (JP)

(73) Assignee: Olympus Corporation, Tokyo (JP)

( * ) Notice: Subject to any disclaimer, the term of this patent is extended or adjusted under 35 U.S.C. 154(b) by 16 days.

(21) Appl. No.: 13/932,669

(22) Filed: Jul. 1, 2013

(65) Prior Publication Data
US 2014/0002691 A1    Jan. 2, 2014

(30) Foreign Application Priority Data
Jul. 2, 2012    (JP) .................................. 2012-148589

(51) Int. Cl.
| | |
|---|---|
| H04N 5/222 | (2006.01) |
| H04N 9/73 | (2006.01) |
| G03B 17/20 | (2006.01) |
| G03B 17/18 | (2006.01) |
| G03B 13/02 | (2006.01) |
| H04N 5/232 | (2006.01) |

(52) U.S. Cl.
CPC ....... H04N 5/23293 (2013.01); H04N 5/23216 (2013.01)

(58) Field of Classification Search
CPC .............. H04N 5/23293; H04N 5/232; H04N 5/23216; G03B 13/02; G03B 17/02; G03B 17/20; G06F 3/041; G06F 1/1647

USPC ............................ 348/333.01-333.13, 222.1; 396/268-276, 281-296, 373-386
See application file for complete search history.

(56) References Cited

U.S. PATENT DOCUMENTS

| | | | |
|---|---|---|---|
| 2004/0189849 A1* | 9/2004 | Hofer ....................... 348/333.03 |
| 2004/0212711 A1* | 10/2004 | Stavely et al. ........... 348/333.03 |
| 2004/0263659 A1 | 12/2004 | Abe | |
| 2005/0088542 A1* | 4/2005 | Stavely et al. ................ 348/239 |
| 2005/0174458 A1* | 8/2005 | Maniwa ................... 348/333.01 |
| 2007/0025723 A1* | 2/2007 | Baudisch et al. ............. 396/287 |
| 2007/0229694 A1 | 10/2007 | Oshima | |
| 2008/0231741 A1* | 9/2008 | McIntyre et al. ........ 348/333.01 |
| 2008/0297625 A1* | 12/2008 | Santo et al. .................... 348/239 |
| 2010/0128138 A1* | 5/2010 | Nitta et al. ................. 348/222.1 |
| 2010/0157128 A1* | 6/2010 | Choi et al. .............. 348/333.03 |
| 2010/0195999 A1* | 8/2010 | Kikuchi ........................ 396/374 |

(Continued)

FOREIGN PATENT DOCUMENTS

| | | |
|---|---|---|
| EP | 1 670 239 | 6/2006 |
| JP | 2005-198068 | 7/2005 |

*Primary Examiner* — Chia-Wei A Chen
(74) *Attorney, Agent, or Firm* — John C. Pokotylo; Straub & Pokotylo

(57) ABSTRACT

An imaging apparatus includes an imaging unit, a first display unit, a second display unit, and a controller. The imaging unit is configured to obtain an image of an object. The first display unit is configured to be observed through an ocular lens. The second display unit includes a touchpanel. The controller is configured to cause the first display to display a live view which is based on the image obtained by the imaging unit and temporarily store the image in a first state. The controller is configured to cause the second display unit to display the image temporarily stored and obtain information concerning image processing based on an output from the touchpanel in a second state.

8 Claims, 10 Drawing Sheets

(56) References Cited

U.S. PATENT DOCUMENTS

| | | | |
|---|---|---|---|
| 2010/0321529 A1* | 12/2010 | Ota | 348/231.3 |
| 2011/0032377 A1* | 2/2011 | Kim et al. | 348/222.1 |
| 2011/0032387 A1* | 2/2011 | Takahashi | 348/231.99 |
| 2011/0164164 A1* | 7/2011 | Aoki et al. | 348/333.01 |
| 2011/0234750 A1* | 9/2011 | Lai et al. | 348/37 |
| 2011/0243397 A1* | 10/2011 | Watkins et al. | 382/118 |
| 2011/0267526 A1* | 11/2011 | Ishihara et al. | 348/333.01 |
| 2011/0273607 A1* | 11/2011 | Nonaka et al. | 348/333.08 |
| 2011/0310285 A1 | 12/2011 | Nakai | |
| 2012/0134642 A1 | 5/2012 | Okamura | |
| 2012/0274825 A1* | 11/2012 | Oogami | 348/333.01 |
| 2012/0274830 A1* | 11/2012 | Kameyama et al. | 348/333.02 |
| 2013/0010170 A1* | 1/2013 | Matsuzawa et al. | 348/333.01 |
| 2013/0083228 A1* | 4/2013 | Iwatani | 348/333.01 |
| 2013/0194479 A1* | 8/2013 | Jogetsu | 348/333.08 |
| 2013/0250156 A1* | 9/2013 | Kameyama et al. | 348/333.01 |
| 2013/0314578 A1* | 11/2013 | Imaizumi et al. | 348/333.02 |
| 2013/0335520 A1* | 12/2013 | Campbell et al. | 348/36 |
| 2014/0085525 A1* | 3/2014 | Ishihara et al. | 348/333.02 |

* cited by examiner

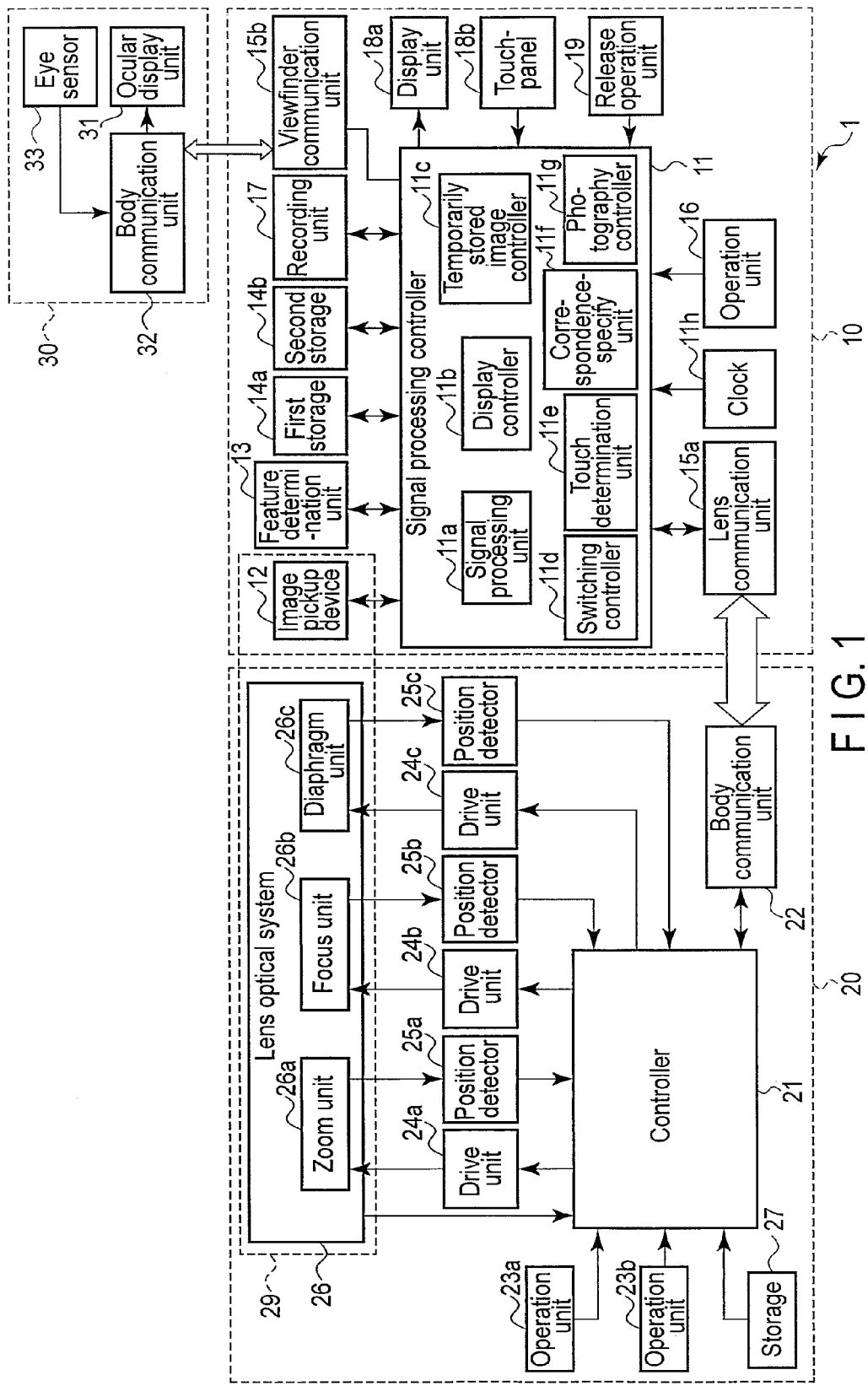
F I G. 1

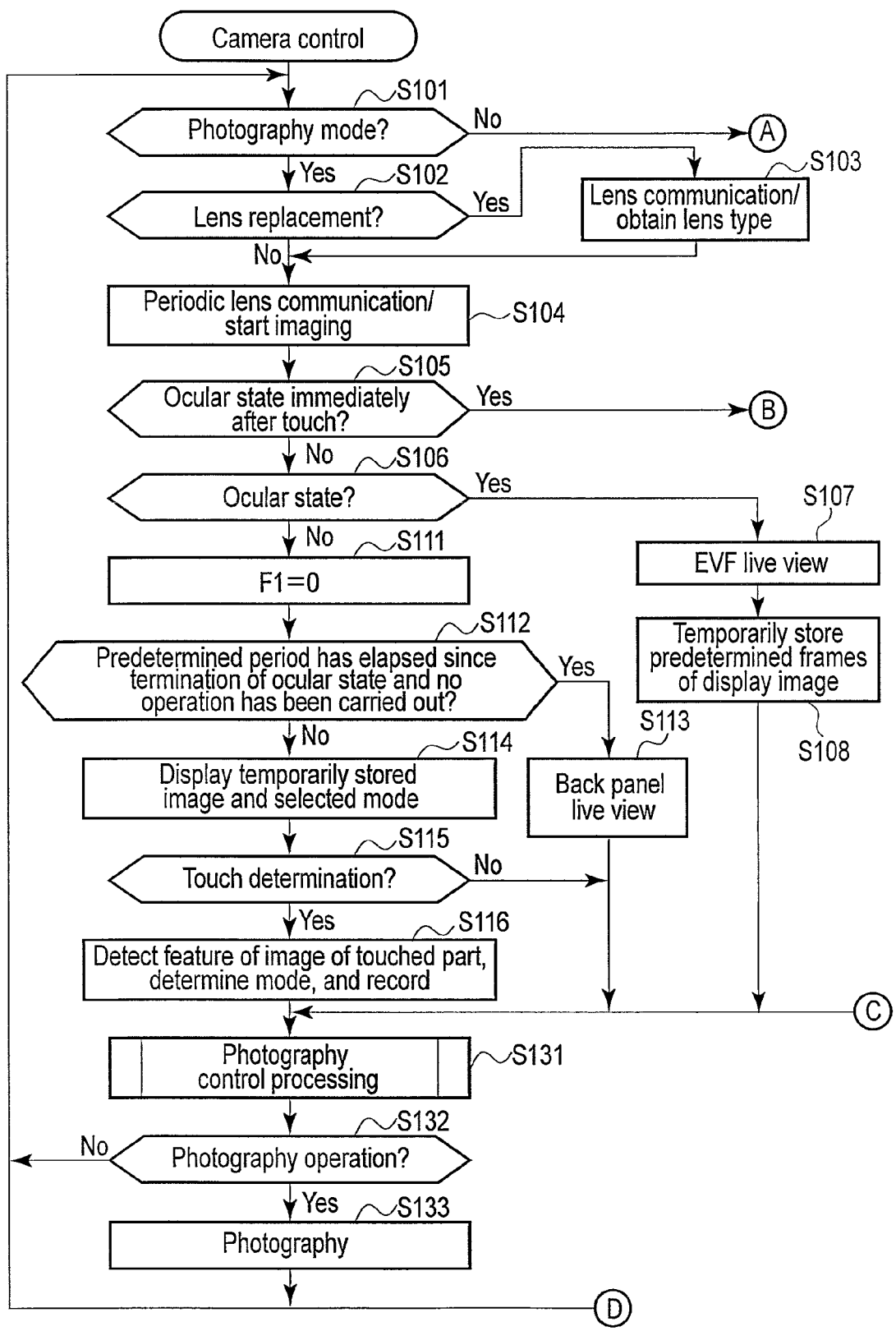
F I G. 2A

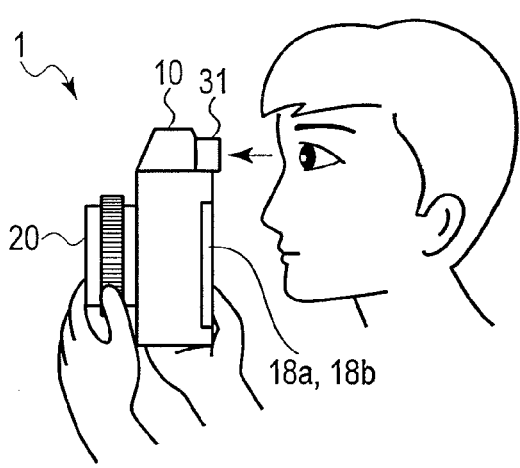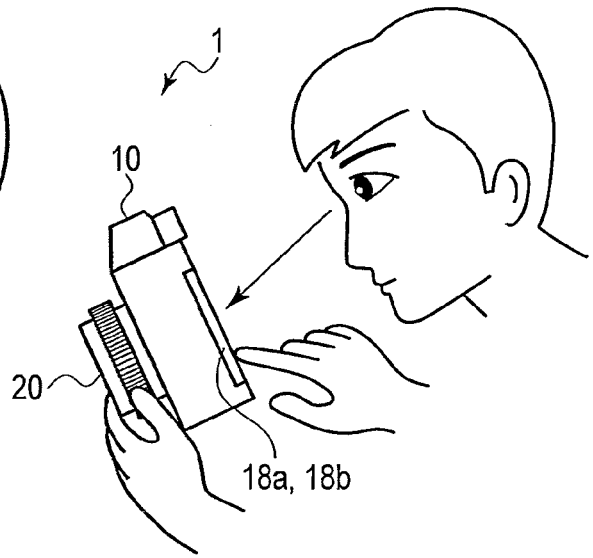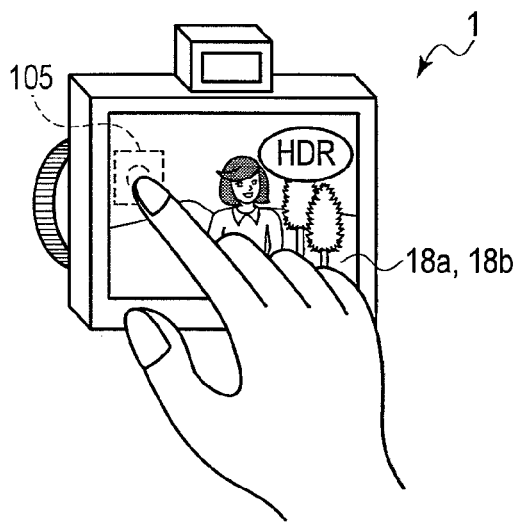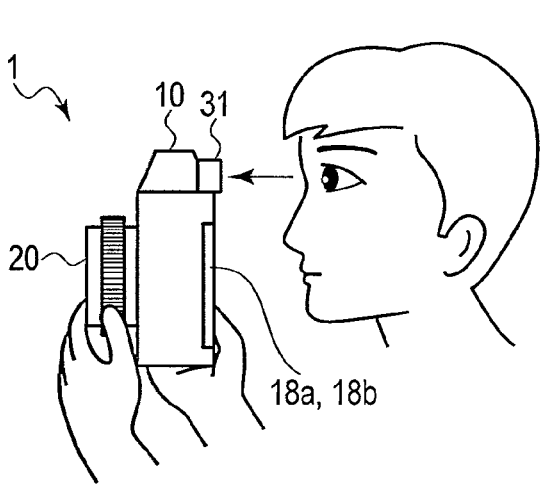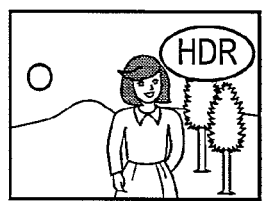
F I G. 5A
F I G. 5B
F I G. 6A
F I G. 6B
F I G. 6C

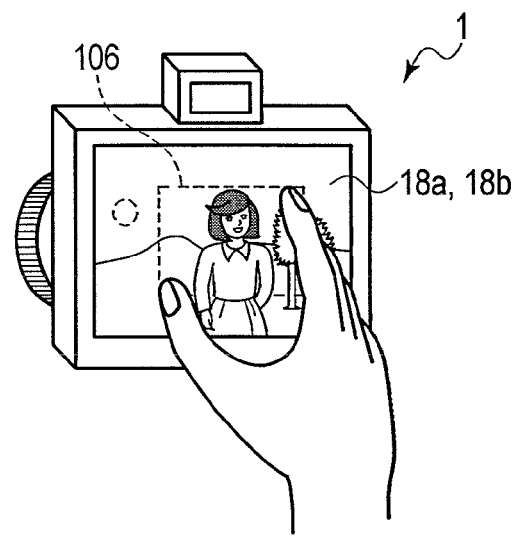
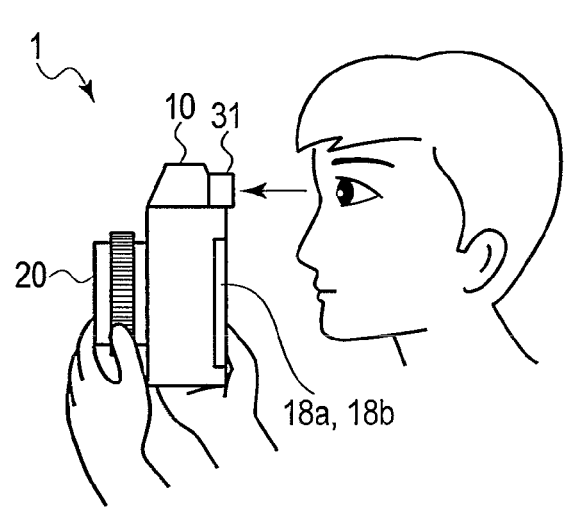
F I G. 7A  F I G. 7B
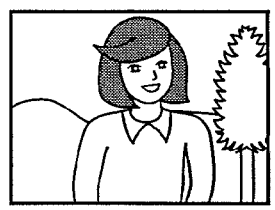
F I G. 7C

IMAGING APPARATUS SUPPORTING DIFFERENT PROCESSING FOR DIFFERENT OCULAR STATES

CROSS-REFERENCE TO RELATED APPLICATIONS

This application is based upon and claims the benefit of priority from prior Japanese Patent Application No. 2012-148589, filed Jul. 2, 2012, the entire contents of which are incorporated herein by reference.

BACKGROUND OF THE INVENTION

1. Field of the Invention

The present invention relates to an imaging apparatus.

2. Description of the Related Art

There is a commonly known imaging apparatus which comprises a back display unit and a touchpanel. A variety of inputs concerning imaging are received through the touchpanel. For example, Jpn. Pat. Appln. KOKAI Publication No. 2005-198068 discloses a technology of obtaining a still image when a touchpanel is touched while performing motion picture capturing.

An electronic viewfinder (EVF) is also commonly known as an ocular display unit for checking an image by looking into the viewfinder. Displaying through the EVF is less influenced by light from outside and therefore provides good visibility. Photography while checking an image through the EVF allows an imaging apparatus to be easily set into a shooting position. Accordingly, use of the EVF is preferred.

BRIEF SUMMARY OF THE INVENTION

According to an aspect of the invention, an imaging apparatus includes: an imaging unit configured to obtain an image of an object; a first display unit configured to be observed through an ocular lens; a second display unit including a touchpanel; and a controller configured to cause the first display to display a live view which is based on the image obtained by the imaging unit and temporarily store the image in a first state, and cause the second display unit to display the image temporarily stored and obtain information concerning image processing based on an output from the touchpanel in a second state.

According to another aspect of the invention, an imaging method includes: obtaining an image of an object by an imaging unit configured to obtain an image; displaying a live view on a first display unit based on the image obtained by the imaging unit, in a first state, the first display unit being configured to be observed through an ocular lens; temporarily storing the image obtained during the displaying of the live view, in the first state; displaying the image temporarily stored in the first state, on a second display unit, in a second state, the second display unit including a touchpanel; and obtaining information concerning image processing based on an output of the touchpanel.

According to still another aspect of the invention, a non-transitory computer readable storage medium for an imaging apparatus includes: code for obtaining an image of an object by an imaging unit configured to obtain an image; code for displaying a live view on a first display unit based on the image obtained by the imaging unit, in a first state, the first display unit being configured to be observed through an ocular lens; code for temporarily storing the image obtained during the displaying of the live view, in the first state; code for displaying the image temporarily stored in the first state, on a second display unit, in a second state, the second display unit including a touchpanel; and code for obtaining information concerning image processing based on an output of the touchpanel.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an embodiment of an example configuration of a digital camera according to the first embodiment;

FIG. 2A and FIG. 2B are flowcharts which show an example of camera control processing according to the first embodiment;

FIG. 5A and FIG. 5B each show for explaining an example of operations of the digital camera according to the first embodiment;

FIG. 6A, FIG. 6B, and FIG. 6C each show for explaining an example of operation of the HDR processing in the digital camera according to the first embodiment;

FIG. 7A, FIG. 7B, and FIG. 7C each show for explaining an example of a zoom operation in the digital camera according to the first embodiment;

DETAILED DESCRIPTION OF THE INVENTION

[First Embodiment]

Figure 2B:
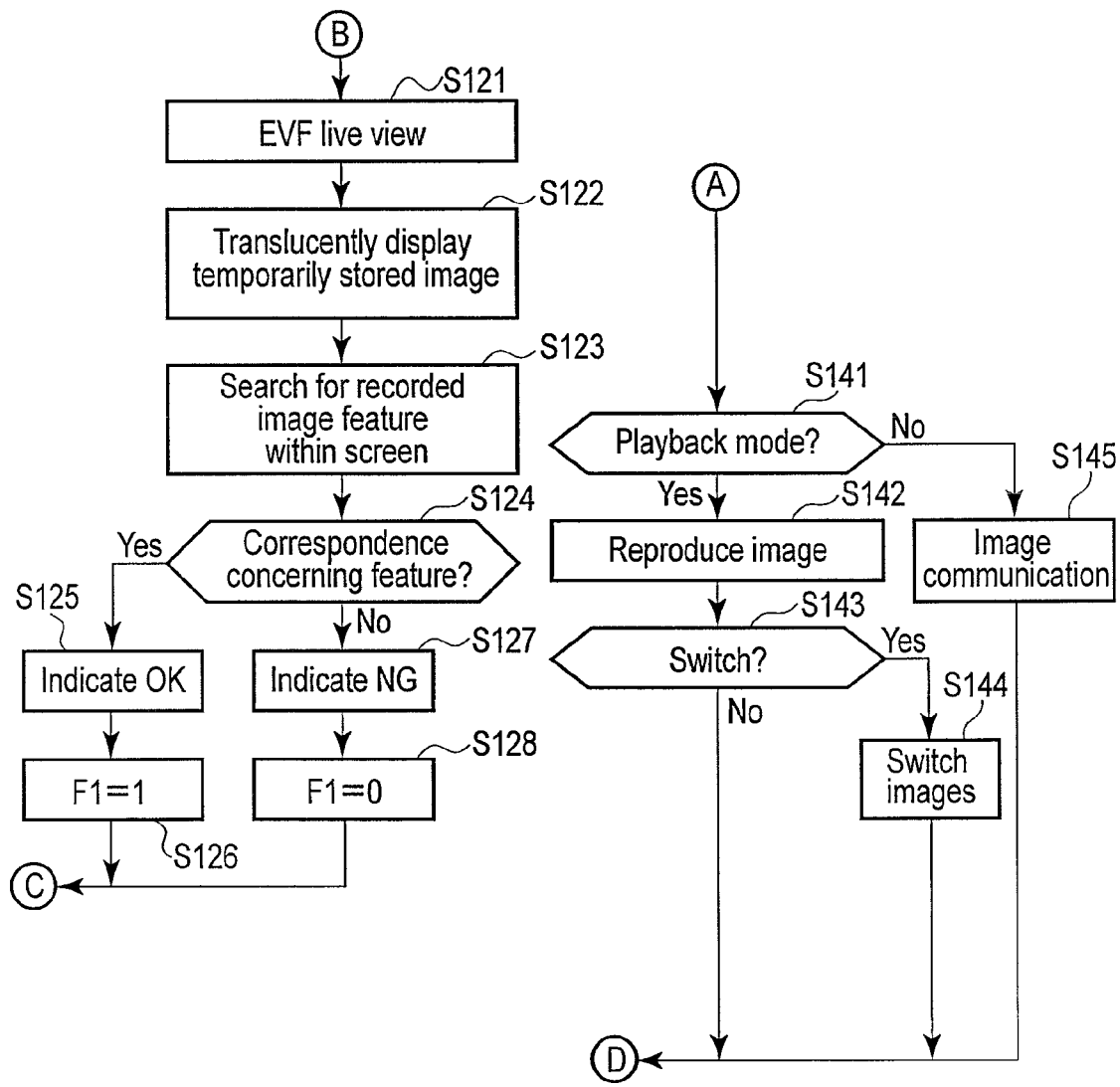

The first embodiment of the invention will be described with reference to the drawings. FIG. 1 schematically shows a digital camera 1 as an imaging apparatus according to the present embodiment. The digital camera 1 is, for example, a camera with interchangeable lenses. However, technologies of the invention are not limited to such a camera with interchangeable lenses but are applicable to a camera with a fixed lens.

The digital camera 1 with interchangeable lenses comprises a camera body 10, a lens 20, and a viewfinder unit 30. A user takes a photograph with a favorite lens 20 attached to the camera body 10. The lens 20 guides an object image to an image pickup device 12 provided in the camera body 10, which will be described later. Descriptions will now be made below supposing that the lens 20 is a zoom lens. The lens 20 comprises a lens optical system 26. A zoom unit 26a, a focus unit 26b, and a diaphragm unit 26c are provided in the lens optical system 26. The zoom unit 26a moves positions of a plurality of lens elements, to perform a zoom function. The focus unit 26b moves a focus lens to make the object image be focused on the image pickup device 12. The diaphragm unit 26c adjusts an amount of light guided to the image pickup device 12 by opening/closing a diaphragm.

The lens 20 comprises a controller 21 which controls operations of the zoom unit 26a, focus unit 26b, and diaphragm unit 26c. Also, the lens 20 comprises a position detector 25a which detects the position of each element in the zoom unit 26a, a position detector 25b which detects the position of each element in the focus unit 26b, and a position detector 25c which detects the position of each element in the diaphragm unit 26c. Still also, the lens 20 comprises a drive unit 24a which drives a motor inside the zoom unit 26a, a drive unit 24b which drives a motor inside the focus unit 26b, and a drive unit 24c which drives a motor inside the diaphragm unit 26c. The lens 20 yet comprises a storage 27 which records lens properties, control data, and programs, and a body communication unit 22 for communicating with the camera body 10.

Based on the control data and programs recorded on a storage 27 and various control parameters obtained through the body communication unit 22, the controller 21 operates the drive unit 24a to drive the zoom unit 26a by using an output from the position detector 25a. Also based on control data and programs recorded on the storage 27 and various control parameters obtained through the body communication unit 22, the controller 21 operates the drive unit 24b to drive the focus unit 26b by using an output from the position detector 25b. Still also based on control data and programs recorded on the storage 27 and various control parameters obtained through the body communication unit 22, the controller 21 operates the drive unit 24c to drive the diaphragm unit 26c by using an output from the position detector 25c.

The lens 20 comprises operation units 23a and 23b. The operation units 23a and 23b are to input operations for the zoom unit 26a, focus unit 26b, and diaphragm unit 26c. A user can adjust operations of the zoom unit 26a, focus unit 26b, and diaphragm unit 26c by operating the operation units 23a and 23b. For example, the operation units 23a and 23b each comprise a ring part which is pivoted along a lens barrel. The ring part allows a shift operation as will be described later. For example, a rotation operation corresponds to an input from the operation unit 23a, and the shift operation corresponds to an input from the operation unit 23b. Alternatively, the operation units 23a and 23b may be operation switches.

For example, the operation unit 23a which is a zoom ring is not mechanically linked to the zoom unit 26a by a gear or a cam. In the lens 20 of the present embodiment, the zoom unit 26a is driven by a mechanism of the drive unit 24a using a small actuator or a mechatronics technology, in accordance with an operation of the operation unit 23a.

On the other side, the camera body 10 comprises a signal processing controller 11 which controls componential units of the camera body 10. The signal processing controller 11 is configured by, for example, an integrated circuit. The signal processing controller 11 is provided with a signal processing unit 11a which can perform image processing required for displaying or recording an image, as will be described later.

The camera body 10 comprises the image pickup device 12. The image pickup device 12 performs an imaging operation. That is, the image pickup device 12 converts into an electrical signal an object image which enters from the lens 20, and generates an image signal. The image pickup device 12 outputs the generated image signal to the signal processing controller 11. The lens optical system 26 and the image pickup device 12 form a part which functions as an imaging unit 29.

The camera body 10 also comprises a display unit 18a on a back surface thereof, for example, as a back panel for displaying an image. The display unit 18a comprises, for example, a liquid-crystal-display panel. The display unit 18a may alternatively comprise a different type of display panel, such as an organic EL panel. In addition, the camera body 10 is configured to allow a viewfinder unit 30 such as an electronic viewfinder (EVF) to be attached to. That is, the viewfinder unit 30 comprises an ocular display unit 31, a body communication unit 32, and an eye sensor 33. On the other side, the camera body 10 comprises a viewfinder communication unit 15b. The body communication unit 32 of the viewfinder unit 30 and the viewfinder communication unit 15b of the camera body 10 are connected and communicate with each other. The ocular display unit 31 comprises a small liquid crystal panel or an organic electroluminescent panel. The viewfinder unit 30 is to magnify a display image by a dedicated optical system (unillustrated ocular lens), and to make the display image viewable from a user. The eye sensor 33 outputs information concerning whether the ocular display unit 31 is looked into by the user or not, to the signal processing controller 11. That is, whether the electronic viewfinder or the back panel is used by the user can be detected. The display unit 18a and the ocular display unit 31 operate under control of a display controller 11b in the signal processing controller 11.

Since the user can observe an image by looking into the viewfinder unit 30, the image can be observed without being influenced by outside light. Further, the viewfinder unit 30 is configured in a manner that visibility can be adjusted to match user's visibility by adjusting the dedicated optical system. Through the visibility adjustment, the user can observe an excellent image irrespective of user's visual acuity. As described above, excellent visibility is obtained according to the viewfinder unit 30. Also according to the viewfinder unit 30, the user can stably hold the digital camera 1 by positioning the camera body 10 near a face.

An operation unit 16 including switches which receive inputs of various operations from the user is provided on the camera body 10. The operation unit 16 is provided with buttons, dials, and a arrow pad by which changes to photography parameters are input, such as a shutter speed, a diaphragm aperture, an exposure correction, a sensitivity setting, and a focus position.

The camera body 10 is provided with a release operation unit 19 at a position where the index finger of the right hand of the user is put. The user can make the digital camera 1 perform a photography operation by operating the release operation unit 19. The release operation unit 19 is configured as a two-step switch, and is set so as to perform, for example, automatic focusing when the first step of the switch is turned on, and an imaging operation when the second step of the switch is turned on.

The camera body 10 comprises a touchpanel 18b. This touchpanel 18b is provided, for example, on the display unit 18a. The touchpanel 18b also receives inputs of instructions from the user. The user can operate the digital camera 1 by, for example, touching positions corresponding to icons displayed on the display unit 18a. For example, the touchpanel 18b is used to input an interested object, a zoom operation, and an exposure adjustment. A signal which the touchpanel 18b generates upon a touch of the user is output to a touch determination unit 11e in the signal processing controller 11, and a signal thereof is processed at first by the touch determination unit 11e.

The camera body 10 comprises a first storage 14a and a second storage 14b. The first storage 14a is, for example, a ROM and stores programs which are used for control performed by the signal processing controller 11. The second storage 14b is, for example, a RAM and temporarily stores a processing result of the signal processing controller 11. The second storage 14b temporarily stores a live view image for a predetermined period while the viewfinder unit 30 is looked into. When a state of allowing the user to use the electronic viewfinder is switched into a state of using the back panel, the live view image which has been observed by the user before this switching operation is temporarily recorded for a constant time period. Any type of image is available insofar as the image allows the user to check, through the back panel, the live view image which has been observed before an operation of the switching as described above. That is, either a motion picture or a still image is available. Resolution of the image need not be equal to that of the live view image.

Further, the camera body 10 is provided with a recording unit 17 for recording image data generated by photography. The recording unit 17 as a common recording medium is detachably connected to the camera body 10. The camera body 10 further comprises a feature determination unit 13 which detects a feature of an object, based on the image signal obtained by the image pickup device 12. The camera body 10 also comprises a lens communication unit 15a for communicating with the body communication unit 22 of the lens 20. Instructions about operations of the lens 20 from the camera body 10 to the lens 20, and transfer of information concerning a status of the lens 20 from the lens 20 to the camera body 10 are performed by the lens communication unit 15a and the body communication unit 22. In addition, the camera body 10 comprises a clock 11h for adding data of photography date/time to photographed images.

The signal processing controller 11 operates in accordance with a program stored in the first storage 14a. The signal processing controller 11 is provided with a signal processing unit 11a, a display controller 11b, a temporarily stored image controller 11c, a switching controller 11d, a touch determination unit 11e, a correspondence-specify unit 11f, and a photography controller 11g. The signal processing unit 11a in the signal processing controller 11 creates a preview image based on the image signal input from the image pickup device 12 in a manner that the user can carry out photography while seeing the display unit 18a or the ocular display unit 31. In accordance with an input from the operation unit 16, the signal processing unit 11a produces a recording image, based on an image signal input from the image pickup device 12 at the time of photography, and makes the recording unit 17 record the recording image.

The display controller 11b in the signal processing controller 11 displays, on the display unit 18a or the ocular display unit 31, the preview image created by the signal processing unit 11a and other images. The temporarily stored image controller 11c in the signal processing controller 11 makes the second storage 14b temporarily store a preview image, and makes the second storage 14b output a past preview image so that the temporarily-stored preview image may be displayed on the display unit 18a upon a request. The switching controller 11d in the signal processing controller 11 determines whether the ocular display unit 31 is being looked into by the user or not, based on the signal obtained from the eye sensor 33. When the ocular display unit 31 is looked into, the switching controller 11d instructs the display controller 11b to make the ocular display unit 31 display the preview image and other images. On the other side, if a predetermined condition is satisfied when the ocular display unit 31 is not looked into, the switching controller 11d instructs the display controller 11b to make the display unit 18a display a past preview image output by the temporarily stored image controller 11c.

The touch determination unit 11e in the signal processing controller 11 obtains a signal from the touchpanel 18b, and obtains an instruction from the user through the touchpanel 18b. The touch determination unit 11e obtains, for example, a region which is touched while a past preview is displayed image on the display unit 18a. The correspondence-specify unit 11f in the signal processing controller 11 in cooperation with the display controller 11b makes the ocular display unit 31 display a current preview image and the past preview image which is rendered translucently by translucence processing, when the ocular display unit 31 is determined to be being looked into by the switching controller 11d after the past preview image is displayed on the display unit 18a. The user can match the past and current preview images with each other by overlaying the current preview image on the translucent past preview image. The correspondence-specify unit 11f obtains a correspondence relationship between the past and current preview images.

The photography controller 11g in the signal processing controller 11 performs, for example, processing described below. The photography controller 11g obtains a region which is touched while the past preview is displayed, the region being obtained by the touch determination unit 11e. The photography controller 11g determines whether the correspondence relationship has been obtained by the correspondence-specify unit 11f or not. If the correspondence relationship has been obtained, the photography controller 11g controls photography in which various functions are effected on the touched region described above. The functions may include, for example, an automatic tracking function, a high dynamic range (HDR) function, and a zoom function.

Operations of the digital camera 1 according to the present embodiment will now be described. Processing by the signal processing controller 11 will be described first with reference to a flowchart (main routine) shown in FIG. 2A and FIG. 2B. In Step S101, the signal processing controller 11 determines whether the photography mode is on or not. If the photography mode is determined to be not on, the processing goes to Step S141. If the photography mode is determined to be on in Step S101, the processing goes to Step S102.

In Step S102, the signal processing controller 11 determines whether lens replacement has been carried out or not. If lens replacement is determined to have been carried out, the processing goes to Step S103. In Step S103, the signal processing controller 11 performs lens communication to obtain a lens type. The processing then goes to Step S104. If the lens replacement is determined to have not been carried out in Step S102, the processing goes to Step S104.

In Step S104, the signal processing controller 11 performs periodic communication with a lens and starts an imaging operation. In Step S105, the signal processing controller 11 determines whether an ocular state occurs (is ON) immediately after a touch is on or not. The ocular state occurring (is ON) immediately after a touch is intended to mean that an ocular state in which the viewfinder unit 30 is looked into switches on within three seconds from a touch on the touchpanel 18b. The period of three seconds is a mere example and may be an arbitrary period. Whether or not the ocular state is on or not is determined based on an output from the eye sensor 33. If the ocular state immediately after a touch is determined to be on, the processing goes to Step S121. If the ocular state immediately after a touch is not determined to be on, the processing goes to Step S106.

In Step S106, the signal processing controller 11 determines whether the ocular state is on or not. That is, whether the ocular state is on or not is determined, based on the output from the eye sensor 33. If the ocular state is determined to be on, the processing goes to Step S107. In Step S107, the signal processing controller 11 makes the ocular display unit 31 display a live view image. In Step S108, the signal processing controller 11 makes the second storage 14b temporarily store the image displayed by live view display for a predetermined number of frames. The processing then goes to Step S131.

If the ocular mode is not determined to be on in Step S106, the processing goes to Step S111. In Step S111, the signal processing controller 11 inputs 0 to an ocular correspondence flag F1. As described later, an ocular correspondence flag F1 of 1 is input if the ocular state is on and if a live view image and a temporarily recorded image correspond to each other. In Step S112, the signal processing controller 11 determines whether or not a predetermined period elapses from an end of the ocular state and the touchpanel 18b has not been operated during the predetermined period. The predetermined time period is set to, for example, two seconds. If the predetermined period is determined to have elapsed without any operation, the processing goes to Step S113. In Step S113, the signal processing controller 11 makes a live view image be displayed on the display unit 18a provided in the back surface of the digital camera 1. The processing then goes to Step S131.

If the predetermined period is determined to have not elapsed or the touchpanel is determined to have been operated in Step S112, e.g., when the touchpanel 18b is touched, the processing goes to Step S114. In Step S114, the signal processing controller 11 makes the display unit 18a display an image temporarily stored in the second storage 14b. The signal processing controller 11 also makes the display unit 18a display icons indicative of modes. In Step S115, the signal processing controller 11 determines whether touchpanel 18b has been touched or not. If the touchpanel 18b is determined to have not been touched, the processing goes to Step S131. Otherwise, if the touchpanel 18b is determined to have been touched, the processing goes to Step S116.

In Step S115, the signal processing controller 11 determines whether the touchpanel 18b has been touched or not. The signal processing controller 11 then makes the feature determination unit 13 detect a feature corresponding to the position which has been touched within the image displayed on the display unit 18a in Step S116. In addition, the signal processing controller 11 determines a mode concerning processing. The signal processing controller 11 makes the feature and mode be recorded. That is, information concerning processing for an image is obtained and stored based on operation of a user's touchpanel. The processing then goes to Step S131.

If the ocular state immediately after a touch is determined to be on in Step S105, the processing goes to Step S121. In Step S121, the signal processing controller 11 makes the ocular display unit 31 display a live view image. In Step S122, the signal processing controller 11 makes the ocular display unit 31 translucently display an image temporarily stored in the second storage 14b, superposed on the live view image. The user can reproduce a composition before moving an eye apart from the ocular display unit 31 by arranging a layout composition so as to overlap the translucently displayed image over the current present live view image. In Step S123, the signal processing controller 11 searches for a feature of the image temporarily stored in the second storage 14b within the live view image.

In Step S124, the signal processing controller 11 determines whether a feature is identical between the temporarily stored image and the live view image or not. If the feature is determined to be identical, the processing goes to Step S125. The aforementioned feature need not strictly be identical. If only a correspondence relationship is obtained concerning an object, the feature may be determined to be identical. In Step S125, the signal processing controller 11 makes the ocular display unit 31 display OK. In Step S126, the signal processing controller 11 inputs 1 to the ocular correspondence flag F1. The processing then goes to Step S131.

If the feature is not determined to be identical in Step S124, the processing goes to Step S127. In Step S127, the signal processing controller 11 makes the ocular display unit 31 display NG. In Step S128, the signal processing controller 11 inputs 0 to the ocular correspondence flag F1. The processing then goes to Step S131.

In Step S131, the signal processing controller 11 performs a photography control processing. In the photography control processing, various functions are performed in accordance with the mode and the touched position obtained in Step S116. The functions may include, for example, an automatic tracking function, a high dynamic range (HDR) function, and a zoom function. When the ocular correspondence flag F1 is 1, moving object tracking and the HDR processing are performed. However, when the ocular correspondence flag F1 is 0, a target of the moving object tracking and a region for which exposure is corrected by the HDR processing is unknown. Therefore, processing is not performed.

Even if no mode is directly selected by the user, a mode may be selected and processing may be performed in accordance with a style of touch detected by the touchpanel 18b as follows. An example of the photography control processing will now be described with reference to a flowchart (subroutine) shown in FIG. 3.

In Step S201, the signal processing controller 11 determines whether the ocular correspondence flag F1 is 1 or not. That is, a determination is made concerning whether or not the ocular state is on and the temporarily stored image and the live view image are identical to each other or the correspondence relationship has been obtained. If F1=1 is determined, the processing goes to Step S202. Processing subsequent to Step S202 is performed based on information concerning processing of an image which is set in accordance with an operation on the touchpanel in Steps S115 and S116. If F1=0 is determined, the processing returns to the main routine.

In Step S202, the signal processing controller 11 determines whether the touchpanel 18b has been touched only at one point or not. If the touchpanel 18b is determined to have been touched only at one point, the processing goes to Step S203. In Step S203, the signal processing controller 11 makes the ocular display unit 31 display a live view image and a tracking frame around an object corresponding to a touched region. In Step S204, the signal processing controller 11 performs the moving-object tracking processing of tracking an object which positions at the touched region. The processing then returns to the main routine.

If the touchpanel 18b is determined to have not been touched only at one point in Step S202, the processing goes to Step S205. In Step S205, the signal processing controller 11 determines whether or not the touchpanel 18b has been touched at two points and these points have been moved to extend distance between the two points. If the touchpanel 18b is determined to have been moved to extend the distance, the processing goes to Step S206. In Step S206, the signal processing controller 11 performs optical zoom processing or electronic zoom processing. Alternatively, the signal processing controller 11 outputs an instruction to the drive unit 24a so as to move the zoom unit 26a, for example, in a zoom-in direction in accordance with a change amount of the distance between the touched two points. That is, the signal processing controller 11 performs image processing to electronically zoom into an image in accordance with a change amount between the touched two points. The processing then returns to the main routine.

If the two points are determined to have not been moved to extend the distance between the two points in Step S205, the processing goes to Step S207. In Step S207, the signal processing controller 11 determines whether the touchpanel 18b has been touched at a plurality of points or not. If the touchpanel 18b is determined to have not been touched at a plurality of points, the processing returns to Step S131. If the touchpanel 18b is determined to have been touched at a plurality of points in Step S207, the processing goes to Step S208. In Step S208, the signal processing controller 11 makes the ocular display unit 31 display a live view image and an image processing frame around an object existing at a touched region. In Step S209, the signal processing controller 11 performs HDR processing concerning a region selected by a touch. That is, a plurality of images are obtained sequentially while changing exposure conditions. For example, an image whose exposure is entirely proper is created by synthesizing images whose exposure conditions differ between a selected image and the other region. The processing then returns to the main routine.

Figure 4:
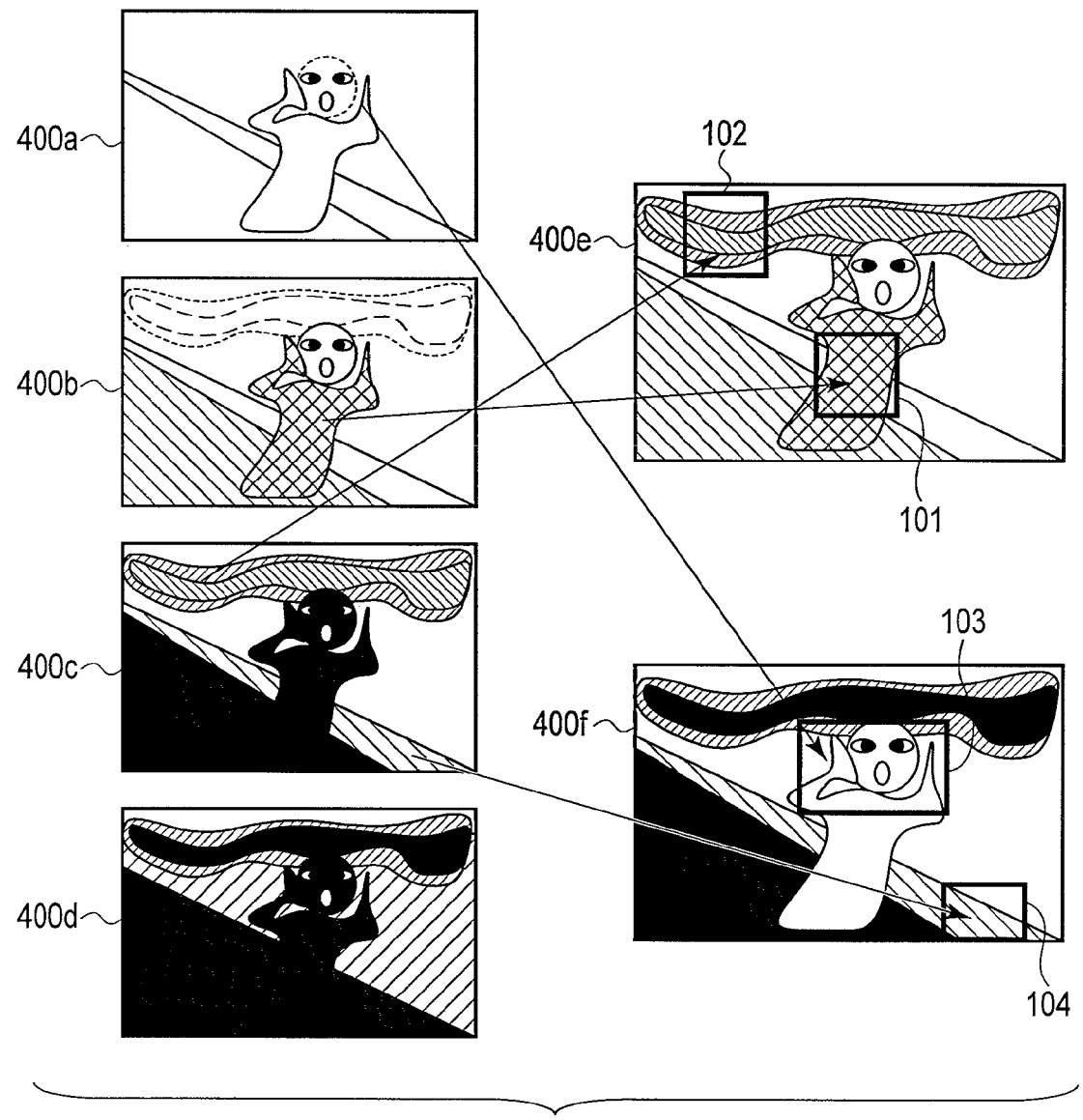
FIG. 4 shows for explaining HDR processing.

The HDR processing will now be described with reference to FIG. 4. Images 400a, 400b, 400c, and 400d are schematic views of four images of an object which were photographed respectively under different exposure conditions. Light exposure of the images 400a, 400b, 400c, and 400d of images changes in this order from overexposure to underexposure. For example, the image 400e in FIG. 4 supposes that parts of frames 101 and 102 were touched. At this time, for example, the image 400b is used for the part of the frame 101 and the image 400c is used for the part of the frame 102, in order that the touched parts have a proper exposure. Accordingly, a synthesized image 400e is created as shown in FIG. 4. Similarly, for example, the image 400e in FIG. 4 supposes that parts of frames 103 and 104 have been touched. At this time, for example, the image 400b is used for the part of the frame 103 and the image 400c is used for the part of the frame 104, in order that the touched parts have proper exposure. A synthesized image 400f is accordingly created as shown in FIG. 4. Thus, in the HDR processing, frames are displayed at touched parts, for example, and a synthesized image is created in a manner that proper exposure is obtained at the touched parts.

Referring back to FIG. 2A, descriptions will be continued. In Step S132, the signal processing controller 11 determines whether a photography operation has been carried out or not. That is, the signal processing controller 11 determines, for example, whether a button of the release operation unit 19 has been pressed or not. If the photography operation is determined to have not been carried out, the processing returns to Step S101. If the photography operation is determined to have been carried out, the processing goes to Step S133. In Step S133, the signal processing controller 11 performs a photography operation. That is, the recording unit 17 is made record an image imaged by the image pickup device 12.

If the photography mode is determined to be not on in Step S101, the processing goes to Step S141. In Step S141, the signal processing controller 11 determines whether the playback mode is on or not. If the playback mode is determined to be on, the processing goes to Step S142. In Step S142, the signal processing controller 11 reproduces an image and makes the display unit 18a display the image. In Step S143, the signal processing controller 11 determines whether switching of images has been selected or not. If the switching is determined to have been selected, the processing goes to Step S144. In Step S144, the signal processing controller 11 switches a displayed image and makes another image be displayed on the display unit 18a. Thereafter, the processing returns to Step S101. If the switching is determined to have not been selected in Step S143, the processing returns to Step S101. If the playback mode is determined to have not been selected in Step S141, the processing goes to Step S145. In Step S145, the signal processing controller 11 performs communication with another terminal. The processing then returns to Step S101.

The order of processing as described above is a mere example and may be appropriately changed within a processable range.

According to the present embodiment, when the ocular state in which the ocular display unit 31 is looked into by the user as shown in FIG. 5A, the camera transits to a state in which the display unit 18a on the back surface is observed as shown in FIG. 5B, an image which the digital camera 1 has photographed and has been temporarily stored in the second storage 14b is displayed on the display unit 18a provided on the back surface of the digital camera 1 during a predetermined period in Step S114.

Subsequently, when the touchpanel 18b is touched, a variety of processing is performed in Step S116 and Step S131, depending on touched regions and/or manners of touches. For example, the HDR mode is selected in the example shown in FIG. 6A. In this example, a part of a setting sun within an image is selected, and a frame 105 is indicated at the selected part. When an ocular state becomes active again as shown in FIG. 6B after this selection, the temporarily stored image is translucently displayed over the live view image. Whether the live view image and the temporarily stored image are identical to each other or not is determined. If the images are determined to be identical, the image subjected to the HDR processing is displayed on the ocular display unit 31, as shown in FIG. 6C. In this case, when the operation unit 23a or the operation unit 23b of the lens 20 is operated, the color of a selected setting sun may be arranged to change in accordance with the operation on the operation unit 23a or 23b.

Further, the live view image and the temporarily stored image need not perfectly be identical to each other. For example, when a blue sky is selected, a function such as the HDR processing need not be effected on a corresponding location on the blue sky but may be performed on any location on the blue sky. Accordingly, the identicalness about a feature in Step S124 needs only to a required extent.

For example, states as shown in FIGS. 7A, 7B, and 7C are obtained if the touchpanel 18b is touched at two points and if the two points are moved extending the distance therebetween to select the zoom operation. That is, as shown in FIG. 7A, when the user looks away from the viewfinder unit 30, a temporarily recorded image is displayed on the display unit 18a. If a region of an image is specified by touching two points on the touchpanel 18b on the display image, a frame 106 is indicated. Thereafter, as shown in FIG. 7B, if the ocular state becomes on again and if the temporarily stored image and the preview image are identical to each other, the image displayed on the ocular display unit 31 is displayed, enlarged by an electronic zoom, as shown in FIG. 7C. In place of the electronic zoom, an optical zoom may be driven. In a zoom operation, a temporarily stored image needs not always be identical to a preview image. Therefore, the zoom operation may be performed irrespective of identicalness of an object.

Figure 8A:
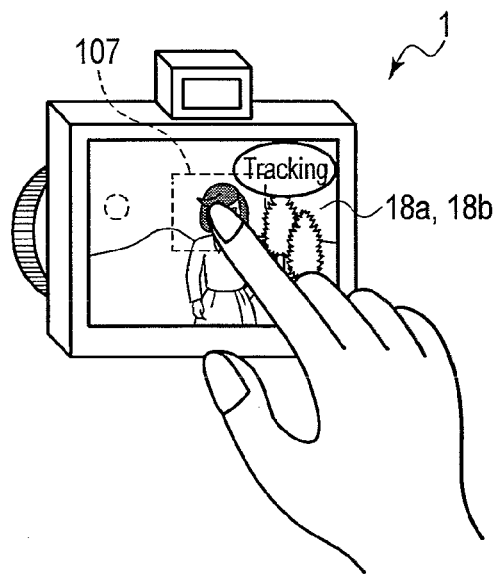
FIG. 8A, FIG. 8B, and FIG. 8C each show for explaining an example of an operation of moving-object tracking processing in the digital camera according to the first embodiment.
Figure 8B:
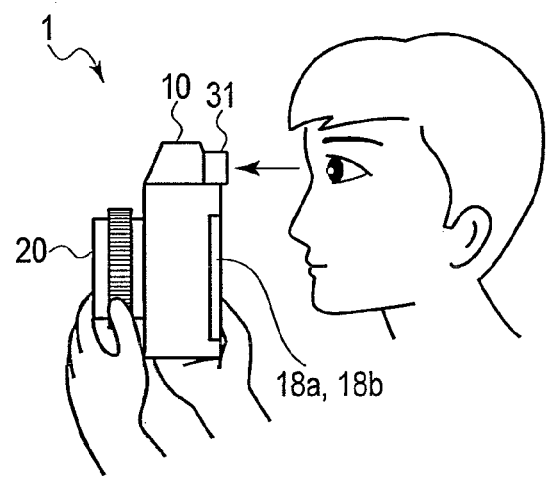
Figure 8C:
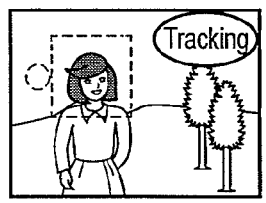

Further, if the touchpanel 18b is touched at one point, for example, the states become as shown in FIGS. 8A, 8B, and 8C. That is, as shown in FIG. 8A, a temporarily recorded image is displayed on the display unit 18a. If a region of an image is specified by touching one point on the display image on the touchpanel 18b, a frame 107 is indicated. Thereafter, an image displayed on the ocular display unit 31 tracks the object indicated by the frame 107 if the ocular state becomes on again as shown in FIG. 8B and if a temporarily stored image and a preview image are identical to each other.

Thus, for example, the imaging unit 29 functions as an imaging unit which obtains an object image. For example, the ocular display unit 31 functions as an ocular display unit which displays the object image. For example, the display unit 18a functions as a display panel which displays the object image. For example, the touchpanel 18b functions as a touchpanel which is provided in the display panel and outputs information of a touched position. For example, the eye sensor 33 functions as a switch-timing obtaining unit which obtains a switch timing at which a first state of making the ocular display unit display a first image as a live view image of the object image and a second state of making the display panel display a second image as a past object image are switched from each other. For example, the switching controller 11d functions as a switching controller which switches the first state and the second state, based on the switch timing. For example, the photography controller 11g functions as a photography controller which processes the first image in the first state, based on an output from the touchpanel in the second state. For example, the touch determination unit 11e functions as a region obtaining unit which obtains a specific region in the second image, based on an output from the touchpanel, in the second state. For example, the correspondence-specify unit 11f functions as a correspondence-specify unit which specifies a region corresponding to the specified region in the first image.

Compared with the display unit 18a on the back surface, the ocular display unit 31 is less influenced by outside light and accordingly provides better visibility. In addition, the digital camera 1 can be held more stably when looking into the ocular display unit 31 than when seeing the display unit 18a. For these reasons, use of the ocular display unit 31 is desirable. On the other side, the user sometimes feels like carrying out various operations such as adjustment of images by using the display unit 18a and the touchpanel 18b on the back surface while the user looks into the viewfinder unit 30 to observe an object. However, it is difficult for a user to operate the touchpanel 18b while looking into the viewfinder unit 30. Otherwise, if a live view image is continuously displayed on the display unit 18a, the user has to be so careful that the position of the digital camera 1 or the direction thereof may not change when the user is going to look away from the viewfinder unit 30 and observes the display unit 18a on the back surface.

In contrast, according to the present embodiment, the user can look away from the viewfinder unit 30 and carry out adjustment of images, observing the display unit 18a, when the user feels like using the touchpanel on the back surface to carry out adjustment of images when looking into the viewfinder unit 30 to observe an object. At this time, when the user moves an eye away from the viewfinder unit 30, the image which has been displayed on the ocular display unit 31 is then displayed on the display unit 18a. Therefore, the user can change the direction of the digital camera 1 in a manner that the touchpanel 18b is easily operated while observing the display unit 18a. Further, after the user performs adjustment of an image by operating the touchpanel 18b, the user can return again to photography while observing the viewfinder unit 30. At this time, in the present embodiment, a relationship of correspondence is obtained between an object subjected to adjustment while seeing the display unit 18a and an object obtained again by the digital camera 1. Therefore, the adjustment of an image as operated by using the touchpanel 18b can be reflected on subsequent photography.

[Second Embodiment]

The second embodiment of the invention will now be described. Differences from the first embodiment will be described below. However, the same parts as those of the first embodiment will be denoted respectively at the same reference signs, and detailed descriptions thereof will be omitted. In the first embodiment, when a user looks away from the ocular display unit 31, an image before the user looks away is displayed on the display unit 18a. In contrast in the present embodiment, for example, when a release operation unit 19 is operated, a REC view image is displayed on a display unit 18a. Various processing is effected on the REC view image as in the first embodiment. Therefore, the digital camera 1 according to the present embodiment need not comprise an eye sensor 33.

Figure 9A:
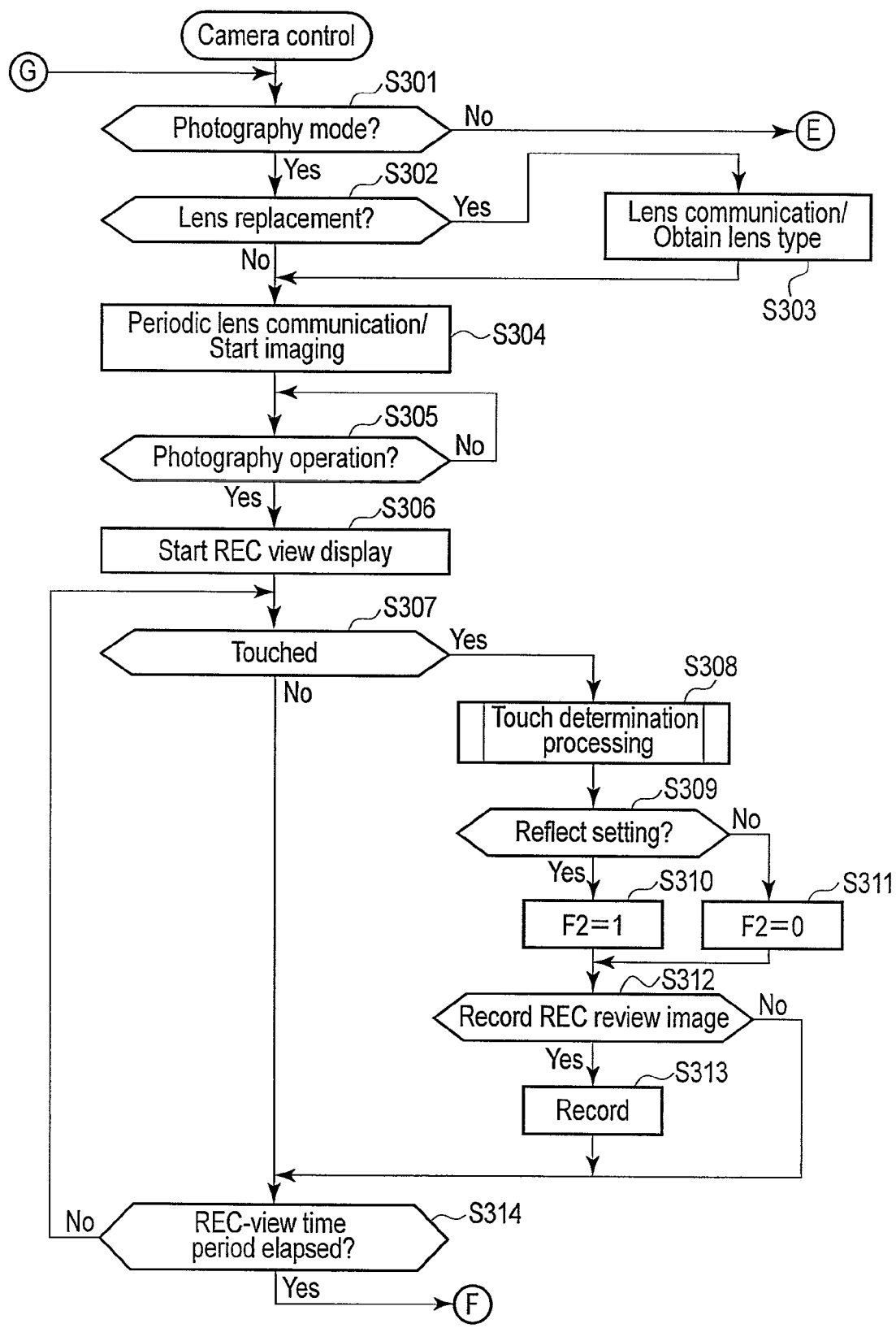
FIG. 9A and FIG. 9B are flowcharts which show an example of camera control processing according to the second embodiment.
Figure 9B:
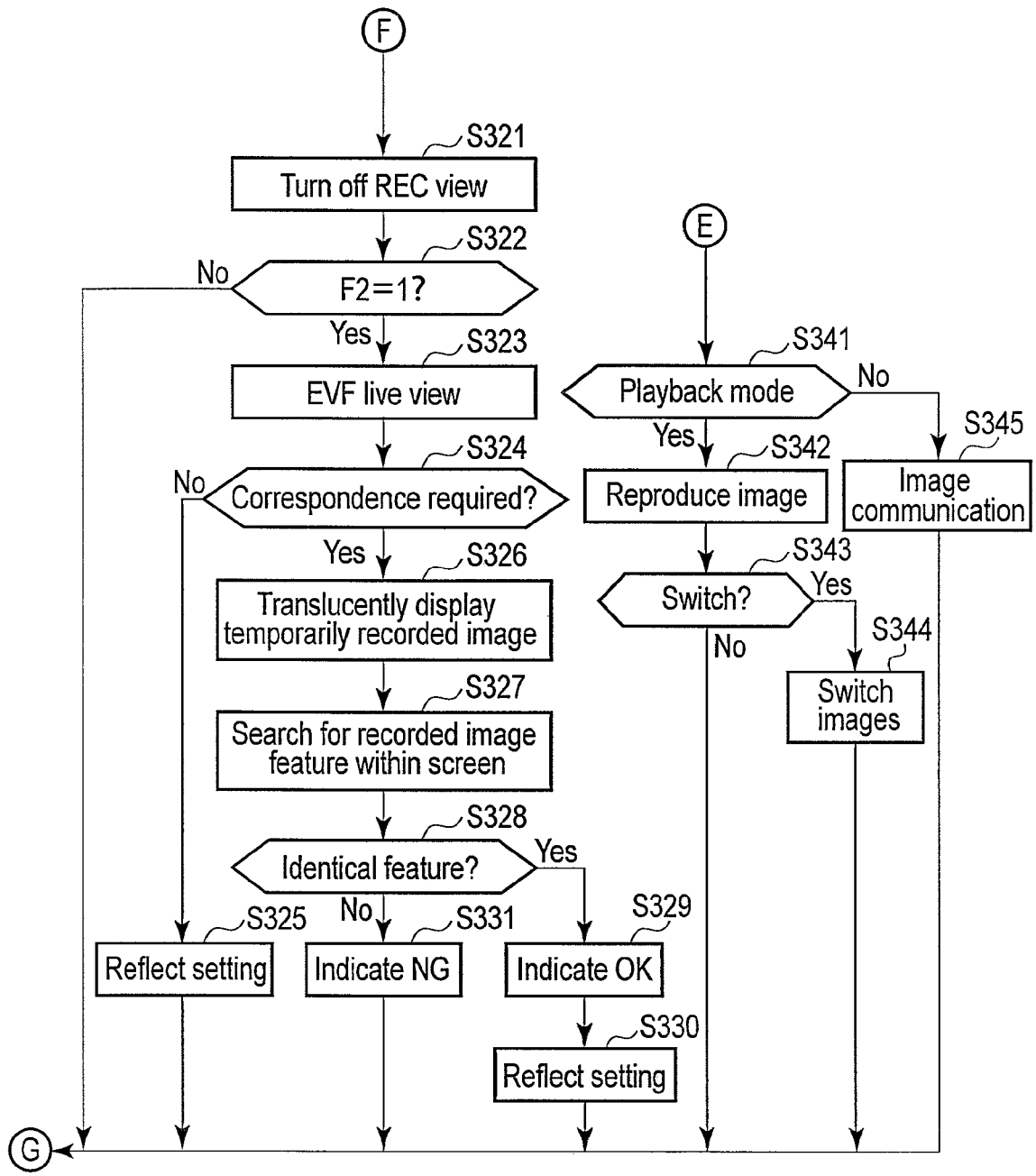

Operations of the digital camera 1 according to the present embodiment will now be described with reference to a flowchart shown in FIG. 9A and FIG. 9B. In Step S301, a signal processing controller 11 determines whether a photography mode is on or not, as in Step S101. If the photography mode is determined to be not on, the processing goes to Step S321. If the photography mode is determined to be on in Step S301, the processing goes to Step S302.

In Step S302, a signal processing controller 11 determines whether lens replacement has been carried out or not, as in Step S102. If lens replacement is determined to have been carried out, the processing goes to Step S303. In Step S303, the signal processing controller 11 performs camera-to-lens-communication to obtain a lens type. The processing then goes to Step S304. If lens replacement is determined to have not been carried out in Step S302, the processing goes to Step S304.

In Step S304, the signal processing controller 11 performs periodic communication with a lens and starts an imaging operation. In Step S305, the signal processing controller 11 determines whether a photography operation such as a press on the release switch of the release operation unit 19 has been carried out or not. The signal processing controller 11 waits for processing until a photography operation is carried out. When the photography operation is determined to have been carried out in Step S305, the processing goes to Step S306.

In Step S306, the signal processing controller 11 obtains an image signal from the image pickup device 12 if the photography operation is determined to have been carried out, and creates a REC view image. The signal processing controller 11 makes a second storage 14b store the created REC view image, and makes the display unit 18a display the image. In Step S307, the signal processing controller 11 determines whether the touchpanel 18b has been touched or not. If the touchpanel 18b is determined to have not been touched, the processing goes to Step S314. If the touchpanel 18b is determined to have been touched in Step S307, the processing goes to Step S308.

Figure 3:
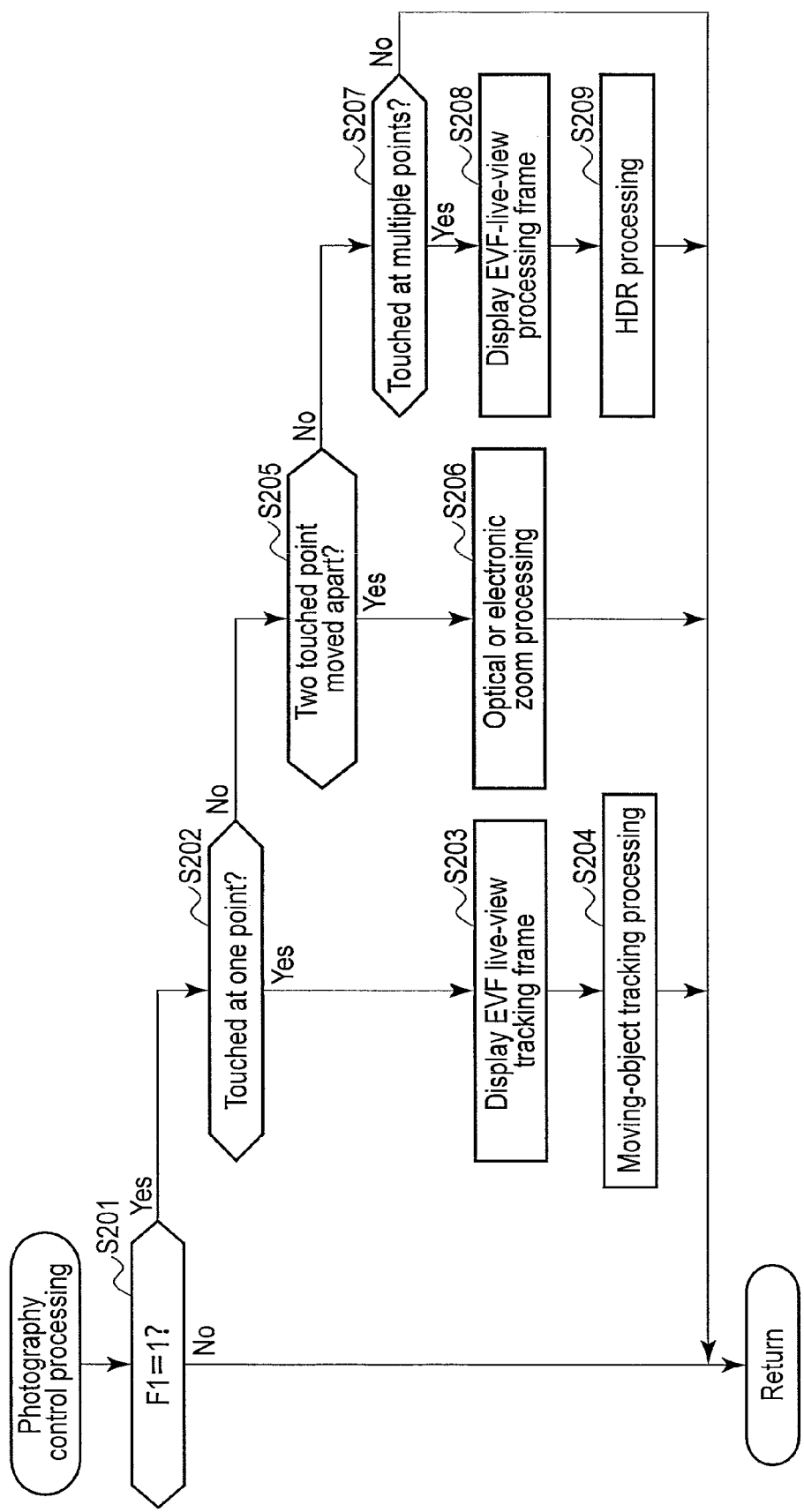
FIG. 3 is a flowchart which shows an example of imaging control processing according to the first embodiment.

In Step S308, the signal processing controller 11 performs a touch determination processing. That is, the signal processing controller 11 associates a style of a touch with processing to be performed later. For example, a correspondence relationship as follows is conceived of. If the touchpanel 18b is touched at one point, tracking processing is performed. If the touchpanel 18b is touched at a point and if the point maintained touched is then slid in an up direction, processing of increasing exposure is performed. Otherwise, if the touchpanel 18b is touched at a point and if the point maintained touched is slid in a down direction, processing of reducing exposure is performed. Still otherwise, if the touchpanel 18b is touched at a point and if the point maintained touched is slid in a right direction, processing of changing a white balance is performed. Also otherwise, if the touchpanel 18b is touched at a point and if the point maintained touched is slid in a left direction, processing of changing an art filter is performed. The art filter is image transformation processing which creates an image intended by a user, such as transformation an image into mono tones or sepia tones. If the touchpanel 18b is touched at a point and if the point maintained touched is then slid circularly drawing a ring, inside of the ring is subjected to the HDR processing. When the touchpanel 18b is touched at two points and if the distance between the two points is changed, a zoom operation is performed according to change of the distance. The descriptions made above relate to a mere example. Various styles of touches can be conceived of, and various processing to be performed can also be conceived of. Various combinations can also be conceived of between styles of touches and nature of processing. The combinations between the styles of touches and the nature of processing may be predetermined or can be set by a user. Even if the user selects a mode as in the first embodiment, a determination as shown in FIG. 3 may be performed. The mode described below may be used in the first embodiment.

In Step S309, the signal processing controller 11 determines whether a setting obtained in Step S308 is to be reflected on later processing or not. For example, the display unit 18a displays an indication which asks whether the setting is to be reflected or not. An instruction input by the touchpanel 18b is obtained. If the setting is determined to be reflected in Step S309, the processing goes to Step S310. In Step S310, the signal processing controller 11 sets a flag F2 to 1 indicating whether the setting is to be reflected or not. If the setting is determined to be not reflected on the processing in Step S309, the processing goes to Step S311. In Step S311, the signal processing controller 11 sets the flag F2 to 0.

In Step S312, the signal processing controller 11 determines whether the REC view image displayed on the display unit 18a is to be recorded or not. For example, the display unit 18a displays an indication which asks whether the image is to be recorded or not. For example, an instruction input from a user by the touchpanel 18b is obtained. If the REC view image is determined to be recorded in Step S312, the processing goes to Step S313. In Step S313, the signal processing controller 11 makes the recording unit 17 record the REC view image. The processing then goes to Step S314. If the REC view image is determined to be not recorded in Step S312, the processing goes to Step S314.

In Step S314, the signal processing controller 11 determines whether a predetermined REC-view time period has elapsed or not. When the REC-view time period is determined to have not elapsed, the processing returns to Step S307. On the other side, if the REC-view time period is determined to have elapsed, the processing goes to Step S321.

The processing goes to Step S321 when the ocular state is set on determined based on output of the eye sensor 33 in place of when the predetermined REC view time period has elapsed. Alternatively, when a predetermined operation is detected by the release operation unit 19 or the operation unit 16, the processing may go to Step S321.

In Step S321, the signal processing controller 11 elapses the REC view image displayed on the display unit 18a. In Step S322, the signal processing controller 11 determines whether the flag F2 is 1 or not. If the flag F2 is determined to be not 1 but 0, the processing returns to Step S301. If the flag F2 is determined to be 1 in Step S322, the processing goes to Step S323. In Step S323, the signal processing controller 11 makes the ocular display unit 31 display a live view image. A12

In Step S324, the signal processing controller 11 determines whether a feature needs to be identical between the temporarily stored image and the live view image or not, in processing obtained by the touch determination processing in Step S308. For example, in the object tracking or HDR processing, the feature needs to be identical. However, the feature need not be identical in the exposure adjustment. If the feature need not be identical in Step S324, the processing goes to Step S325. In Step S325, the signal processing controller 11 reflects, on a preview image, processing determined and set in Step S308. The processing then returns to Step S301.

If the feature need not be identical in Step S324, the processing goes to Step S326. In Step S326, the signal processing controller 11 makes the ocular display unit 31 translucently display the REC view image stored in the second storage 14b. In Step S327, the signal processing controller 11 searches for a feature of the REC view image temporarily stored in the second storage 14b, within the live view image. In Step S328, the signal processing controller 11 determines whether the feature is identical between the temporarily stored image and the live view image or not. If the feature is determined to be identical, the processing goes to Step S329. The feature need not be strictly identical but the feature may be determined to be identical if only a relationship of correspondence concerning an object is obtained. In Step S329, the signal processing controller 11 makes the ocular display unit 31 display OK. In Step S330, the signal processing controller 11 reflects, on a preview image, processing determined and set in Step S308. The processing then returns to Step 5301. If the feature is determined to be not identical in Step S328, the processing goes to Step S331. In Step S331, the signal processing controller 11 makes the ocular display unit 31 display NG. The processing then returns to Step S301.

If the photography mode is determined to be not on in Step S301, the processing goes to Step S341. In Step S341, the signal processing controller 11 determines whether a playback mode is on or not. If the playback mode is determined to be on, the processing goes to Step S342. In Step S342, the signal processing controller 11 reproduces an image and makes the display unit 18a display the image. In Step S343, the signal processing controller 11 determines whether image switching has been selected or not. If the switching is determined to have been selected, the processing goes to Step S344. In Step S344, the signal processing controller 11 switches a displayed image and makes the display unit 18a display another image. The processing then returns to Step S301. If switching is determined to have not been selected in Step S343, the processing returns to Step S301. If the playback mode is determined to have not been selected in Step S341, the processing goes to Step S345. In Step S345, the signal processing controller 11 performs communication with another terminal. The processing then returns to Step S301.

According to the present embodiment, for example, when the release operation unit 19 which is a release switch is pressed, a REC view image is displayed on the display unit 18a. The same processing as in the first embodiment is performed on this image. As a result, the same effects as obtained in the first embodiment are obtained. In the present embodiment, a user can intentionally determine an image displayed on the display unit 18a, unlike the first embodiment based on an output from the eye sensor 33. Therefore, the user can easily reflect their own intentions on image processing.

In the present embodiment, when a photography operation is carried out, REC view display is performed. However, the REC view display is not limited to the photography operation. For example, the operation unit 16 may be provided with a capture switch in addition to the release operation unit 19. The REC view display may be performed by this capture switch.

The invention may be achieved in a manner that a recording medium recording program codes of software which perform the functions disclosed in the above embodiments is supplied to an electronic apparatus, and a computer (such as a microcontroller, a microprocessor, a CPU, or a MPU) of the electronic apparatus reads and performs programs stored in the memory medium. That is, the program codes read from the memory medium perform the functions of the embodiment, and a storage medium which records the program codes configures the invention.

The functions disclosed in the embodiment can be performed not only by performing the program codes which are read by a computer. The program codes may use a part of processing functions which are included in an operating system (OS) installed in a computer of an electronic apparatus.

The computer which performs the program codes read from the memory medium is not limited to a single computer. A plurality of computers existing in an electronic apparatus may be connected and cooperate with each other to perform the program codes. Alternatively, an electronic apparatus and a peripheral apparatus may be connected. Computers existing in both apparatuses may be connected and made cooperate with each other to perform the program codes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging unit configured to obtain an image of an object;
   a first display unit configured to be observed through an ocular lens;
   a second display unit including a touchpanel; and
   a controller configured to cause the first display unit to display a live view which is based on the image obtained by the imaging unit, in a first state,
   temporarily store the image in the first state,
   cause the second display unit to display the image temporarily stored in a second state,
   obtain information concerning image processing based on an output from the touchpanel in the second state,
   cause the first display unit to display a live view based on the image obtained by the imaging unit in a third state,
   determine whether a feature of the live view is similar to a feature of the temporarily stored image or not in the third state, and
   perform processing on the image obtained by the imaging unit based on the information concerning the image processing obtained in the second state responsive to a determination that the feature of the live view is similar to the feature of the temporarily stored image, in a third state.

2. The imaging apparatus according to claim 1, further comprising a switch, wherein the controller is configured to switch the first state and the second states, in accordance with an operation of the switch.

3. The imaging apparatus according to claim 2, wherein: the processing on the image includes at least one of high dynamic range processing, zoom processing, exposure processing, white balance processing, and image conversion processing.

4. The imaging apparatus according to claim 1, further comprising an eye sensor which detects whether the first display unit is observed or not, wherein the controller is configured to switch the first state and the second states, in accordance with an output of the eye sensor.

5. The imaging apparatus according to claim 4, wherein the processing on the image includes at least one of high dynamic range processing, zoom processing, exposure processing, white balance processing, and image conversion processing.

6. The imaging apparatus according to claim 1, wherein the controller causes the first display unit to translucently display the temporarily stored image superimposed on the live view, in the third state.

7. An imaging method comprising:
   obtaining an image of an object by an imaging unit configured to obtain an image;
   displaying a live view on a first display unit based on the image obtained by the imaging unit, in a first state, the first display unit being configured to be observed through an ocular lens;
   temporarily storing the image obtained during the displaying of the live view, in the first state;
   displaying the image temporarily stored in the first state, on a second display unit, in a second state, the second display unit including a touchpanel;
   obtaining information concerning image processing based on an output of the touchpanel in the second state;
   displaying a live view based on the image obtained by the imaging unit on the first display, in a third state;
   determining whether a feature of the live view is similar to a feature of the temporarily stored image or not, in the third state; and
   performing processing on the image obtained by the imaging unit based on the information concerning the image processing obtained in the second state responsive to a determination that the feature of the live view is similar to the feature of the temporarily stored image, in the third state.

8. A nontransitory computer readable storage medium for an imaging apparatus, the medium comprising:
   code for obtaining an image of an object by an imaging unit configured to obtain an image;
   code for displaying a live view on a first display unit based on the image obtained by the imaging unit, in a first state, the first display unit being configured to be observed through an ocular lens;
   code for temporarily storing the image obtained during the displaying of the live view, in the first state; code for displaying the image temporarily stored in the first state, on a second display unit, in a second state, the second display unit including a touchpanel;
   code for obtaining information concerning image processing based on an output of the touchpanel, in the second state;
   code for displaying a live view based on the image obtained by the imaging unit on the first display, in a third state;
   code for determining whether a feature of the live view is similar to a feature of the temporarily stored image or not, in the third state; and
   code for performing processing on the image obtained by the imaging unit based on the information concerning the image processing obtained in the second state responsive to a determination that the feature of the live view is similar to the feature of the temporarily stored image, in the third state.

\* \* \* \* \*